(12) United States Patent
Kuhne et al.

(10) Patent No.: US 10,152,459 B2
(45) Date of Patent: Dec. 11, 2018

(54) INTELLIGENT WINDOW PLACEMENT WITH MULTIPLE WINDOWS USING HIGH DPI SCREENS

(71) Applicant: Google LLC, Mountain View, CA (US)

(72) Inventors: Stefan Kuhne, San Jose, CA (US); Alexander Friedrich Kuscher, San Francisco, CA (US); Scott Ronald Violet, Sunnyvale, CA (US); John Nicholas Jitkoff, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 1188 days.

(21) Appl. No.: 13/772,268

(22) Filed: Feb. 20, 2013

(65) Prior Publication Data

US 2014/0237421 A1 Aug. 21, 2014

(51) Int. Cl.
*G06F 17/21* (2006.01)

(52) U.S. Cl.
CPC .......... *G06F 17/211* (2013.01); *G06F 17/214* (2013.01)

(58) Field of Classification Search
CPC ................ G06F 6/0481; G06F 3/0483; G06F 2203/04803–2203/04805; G06F 17/211; G06F 17/214
See application file for complete search history.

(56) References Cited

U.S. PATENT DOCUMENTS

| | | | |
|---|---|---|---|
| 5,477,241 A * | 12/1995 | Higgins | G06F 3/04897 345/661 |
| 7,152,211 B1 | 12/2006 | Fernandez et al. | |
| 7,480,872 B1 | 1/2009 | Ubillos | |
| 7,730,418 B2 | 6/2010 | Wang et al. | |
| 2005/0182755 A1 * | 8/2005 | Tran | G06F 17/30011 |
| 2006/0227153 A1 * | 10/2006 | Anwar | G06T 3/0012 345/660 |
| 2008/0030425 A1 | 2/2008 | Fullerton et al. | |

(Continued)

FOREIGN PATENT DOCUMENTS

| | | |
|---|---|---|
| EP | 2053592 A2 | 4/2009 |
| JP | H 07-334338 A | 12/1995 |

(Continued)

OTHER PUBLICATIONS

"Display Resolution", retrieved from <en.wikipedia.org/wiki/Display_resolution>, Dec. 13, 2012, pp. 1-9.

(Continued)

*Primary Examiner* — Mandrita Brahmachari

(74) *Attorney, Agent, or Firm* — Morgan, Lewis & Bockius LLP

(57) ABSTRACT

The subject technology discloses configurations for determining a minimum dots per inch (DPI) setting for displaying graphical content in a window based on a native pixel density of a display. Respective graphical content is scaled for displaying in a first window based on the minimum DPI setting to fit a horizontal dimension of the first window. The subject technology then scales respective graphical content for displaying in a second window based on the minimum DPI setting to fit a horizontal dimension of the second window. In some configurations, the graphical content in the first window is scaled at a different DPI setting than the graphical content in the second window.

23 Claims, 6 Drawing Sheets

(56) References Cited

U.S. PATENT DOCUMENTS

| | | | |
|---|---|---|---|
| 2008/0077384 A1* | 3/2008 | Agapi | G06F 17/289 704/2 |
| 2008/0144051 A1* | 6/2008 | Voltz | G06F 3/14 358/1.2 |
| 2008/0177994 A1* | 7/2008 | Mayer | G06F 9/4418 713/2 |
| 2008/0238945 A1 | 10/2008 | Wakizaka | |
| 2009/0144653 A1* | 6/2009 | Ubillos | G06F 3/0483 715/800 |
| 2009/0309808 A1 | 12/2009 | Swingler | |
| 2009/0315917 A1 | 12/2009 | Uehori et al. | |
| 2012/0030616 A1 | 2/2012 | Howes et al. | |
| 2012/0092305 A1 | 4/2012 | Barnes | |
| 2012/0110438 A1 | 5/2012 | Peraza et al. | |
| 2013/0031468 A1* | 1/2013 | Lee | G06F 9/4443 715/236 |
| 2013/0162502 A1* | 6/2013 | Lee | G09G 5/003 345/1.2 |
| 2013/0191625 A1* | 7/2013 | Mullens | G06F 9/4451 713/100 |
| 2014/0225928 A1* | 8/2014 | Konnola | G06F 17/30899 345/636 |

FOREIGN PATENT DOCUMENTS

| | | |
|---|---|---|
| JP | 2002-297279 A | 10/2002 |
| JP | 2003-333308 A | 11/2003 |
| JP | 2004-086621 A | 3/2004 |
| JP | 2008-242176 A | 10/2008 |
| JP | 2010-002577 A | 1/2010 |
| JP | 2011-099977 A | 5/2011 |

OTHER PUBLICATIONS

Neuhas, Sven, "DPI Calculator / PPI Calculator", retrieved from <members.ping.de/~sven/dpi.html>, 2004-2012, pp. 1-2.

"DPI Display Settings", retrieved from <ss64.com/nt/syntax-dpi.html>, 1999-2012, pp. 1-2.

Shultz, Greg, "Get a Better View in Windows 7 by Adjusting DPI Scaling", retrieved from <www.techrepublic.com/blog/window-on-windows/get-a-better-view-in-windows-7-by-adjusting-dpi-scaling/5404>, Dec. 1, 2011, pp. 1-7.

"Chromium—An Open-Source Browser Project to Help Move the Web Forward", retrieved from <https://code.google.com/p/chromium/issues/detail?id=679> on Jan. 17, 2013, pp. 1-15.

"Pixel Density", retrieved from <en.wikipedia.org/wiki/Pixel_density>, Jan. 7, 2013, pp. 1-5.

Japanese Office Action from Japanese Patent Application No. 2015-558907, dated Dec. 19, 2017, 9 pages.

Chinese Office Action from Chinese Patent Application No. 201480009686.9, dated Feb. 2, 2018, 25 pages.

* cited by examiner

INTELLIGENT WINDOW PLACEMENT WITH MULTIPLE WINDOWS USING HIGH DPI SCREENS

BACKGROUND

The subject technology generally relates to graphical user interfaces for displaying graphical content or fonts.

SUMMARY

The subject technology provides for determining a minimum dots per inch (DPI) setting for displaying graphical content in a window based on a native pixel density of a display; scaling respective graphical content for displaying in a first window based on the minimum DPI setting to fit a horizontal dimension of the first window; and scaling respective graphical content for displaying in a second window based on the minimum DPI setting to fit a horizontal dimension of the second window.

The subject technology provides for receiving input for modifying a horizontal size of a first window, wherein the first window includes respective graphical content for display; adjusting the horizontal size of the first window in response to the received input; and scaling the respective graphical content in the first window to fit the adjusted horizontal size of the first window.

Yet another aspect of the subject technology provides a system. The system includes memory, one or more processors, and one or more modules stored in memory and configured for execution by the one or more processors. The system includes a windowing module configured to determine a minimum dots per inch (DPI) setting for displaying graphical content in a window based on a native pixel density of a display, scale respective graphical content for displaying in a first window based on the minimum DPI setting to fit a horizontal dimension of the first window, and scale respective graphical content for displaying in a second window based on the minimum DPI setting to fit a horizontal dimension of the second window; and a graphical user interface (GUI) display module configured to provide for display the scaled respective graphical content in the first window and the second window.

The subject technology further provides for a non-transitory machine-readable medium comprising instructions stored therein, which when executed by a machine, cause the machine to perform operations including determining a minimum dots per inch (DPI) setting for displaying graphical content in a window based on a native pixel density of a display; scaling respective graphical content for displaying in a first window based on the minimum DPI setting to fit a horizontal dimension of the first window; and scaling respective graphical content for displaying in a second window based on the minimum DPI setting to fit a horizontal dimension of the second window.

It is understood that other configurations of the subject technology will become readily apparent from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The features of the subject technology are set forth in the appended claims. However, for purpose of explanation, several configurations of the subject technology are set forth in the following figures.

DETAILED DESCRIPTION

Figure 1:
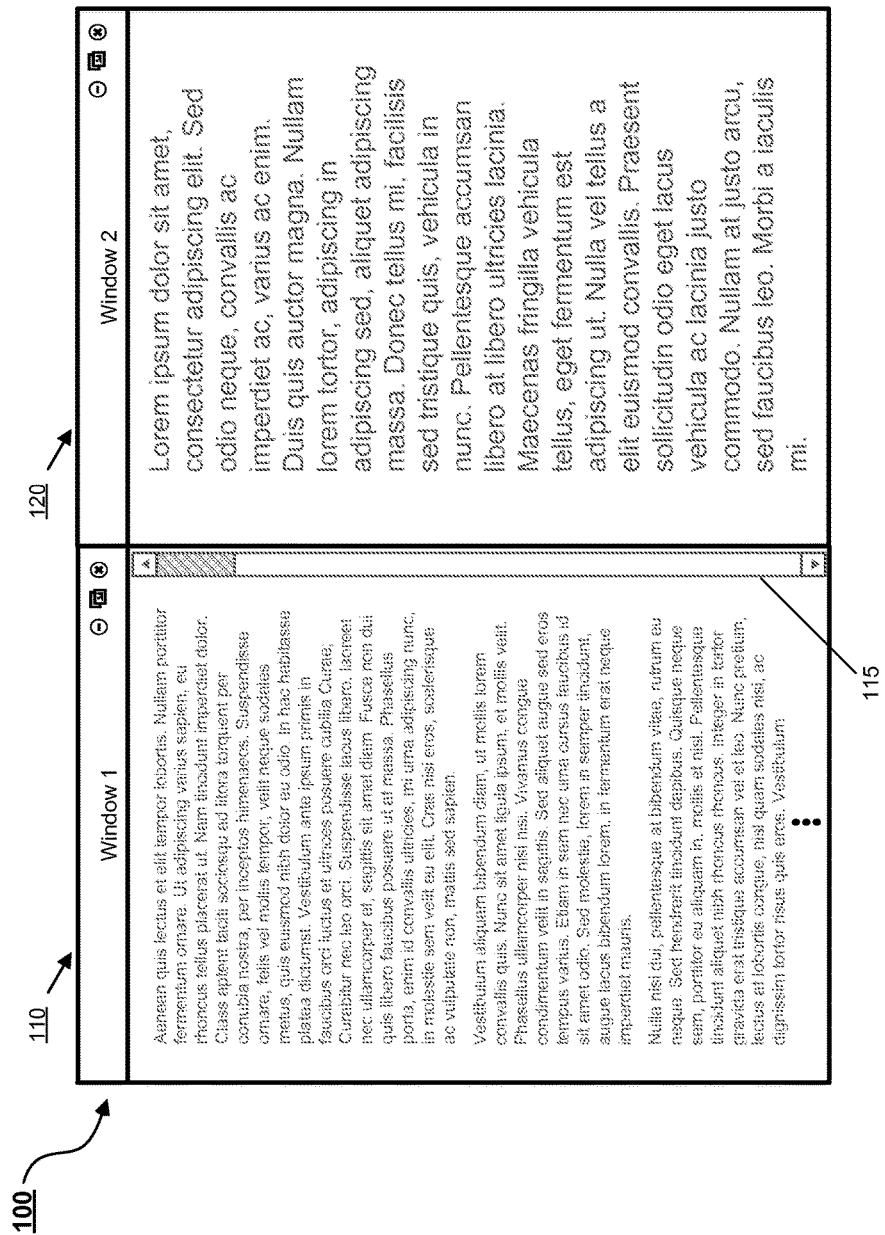
FIG. 1 conceptually illustrates an example graphical user interface (GUI) for displaying respective graphical content at independent DPI display settings in which some configurations of the subject technology can be implemented FIG. 2 conceptually illustrates an example GUI for displaying graphical content after receiving input for adjusting a size of a particular window in which some configurations of the subject technology can be implemented.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

In a typical configuration provided by a given operating system or application (e.g., web browser), a default setting for displaying graphics and/or fonts may be set as 96 DPI (dots per inch) on a display screen. A display screen, however, may have up to 300 DPI based on the physical characteristics of the display screen. In this regard, the display screen includes a number of pixels typically expressed as a display resolution in terms of a number of pixels in width×height. In an example in which the display resolution is 2560×1600 pixels for a 15 inch diagonal size of a display screen, a pixels per inch (PPI) or pixel density of the display screen can be determined by calculating the square root of a sum of respective squares of the width and height that is divided by the diagonal size of the display screen (e.g., $PPI=\sqrt{(W^2+H^2)}/S$). In this example, a PPI calculation determines that the PPI for the 15" display with 2560×1600 pixels is approximately 201.26 PPI. Thus, an ideal DPI for the display screen can be set to ~201 DPI.

In some configurations, in order to "emulate" font size and/or graphical content display for a lower DPI setting (e.g., 96 DPI), a number of pixels displaying graphics is effectively reduced (e.g., 2560×1600 pixels to 1400×1024 pixels) by utilizing a DPI compensation technique to automatically adjust an input graphic image (e.g., bitmap) to match the DPI setting. In one example, the DPI compensation technique uses additional pixels as "subpixels" for rendering of fonts and/or graphical content that may scale the content in accordance to the DPI setting.

Given that a display screen may have a native PPI that exceeds the DPI setting of the operating system or application, the subject technology uses the capability of these high PPI displays to show more content in a smaller space. For a display screen with a maximum display resolution of 2560× 1600 pixels with a current display setting of 1600×1200 pixels, the subject technology can create two 800×1200 windows side by side. Since the underlying display is able to show many more physical pixels (e.g., 2560×1600, occupying the same space), the subject technology (e.g., a window manager provided by the subject technology) can adjust the DPI setting for the content of each individual window dynamically within a range which can be specified by the user. In one example, the subject technology provides an automatic window management system to perform the following functions and features.

For instance, the user could specify a range of resolutions for displaying fonts or graphical content that is comfortable based on the user's eye sight. In one example, this could be accomplished in a first run step or settings dialog where the user can specify which minimum font size is still readable to the user at a corresponding DPI display setting. Based on this minimum DPI display setting, the subject technology may avoid overlapping windows that are displayed side by side since respective DPI values for each window can dynamically be adjusted to avoid horizontal scrollbars from being displayed. Thus, when opening 2 windows, the subject technology can put them side by side and adjust the DPI values of each window separately to show as much content as possible (e.g., using the minimum DPI display) which is ideally the full content for both windows. Displaying the full content for a window as used herein can be understood as being able to display the entirety of the content displayed in the window without utilizing horizontal or vertical scroll bars. Alternatively, in an example in which the full content is not able to be displayed without utilizing a horizontal scrollbar according to the minimum DPI display setting, the subject technology may display the content to the extent possible in the horizontal direction without the usage of a horizontal scroll bar and then utilize a vertical scroll bar to provide the remainder of the content in the window.

In one example, the two aforementioned windows may include behavior which "snaps" the two windows together, so the user could move the divider line between the two windows to either side and the content in the window gets dynamically DPI sized again. In this regard, the window which is decreased in size would increase the DPI value by shrinking the content and the window which is increased in size would reduce the DPI size by increasing the content size. In some configurations, upon increasing the DPI size (e.g., scaling the content smaller), if the content of a respective window is scaled too small beyond the minimum DPI display setting (e.g., where fonts would get even smaller than the smallest readable font), a fallback to a mobile version of the same web content is attempted, if available, before falling back to show a horizontal scrollbar. If there is no mobile equivalent of the content for display, then horizontal and/or vertical scrollbars are shown.

In some configurations, the subject technology may be configured to increase a size of a window containing the focus (e.g., an active or selected window) so that the window is more easily readable and decrease/shrink the other non-active window while keeping the DPI display setting within the specified minimum DPI display setting discussed above.

FIG. 1 conceptually illustrates an example graphical user interface (GUI) 100 for displaying respective graphical content at independent DPI display settings in which some configurations of the subject technology can be implemented. The GUI 100 illustrated in FIG. 1 may be provided on one or more computing devices or systems. For instance, the GUI 100 may be provided on a computing device or system, which may provide an operating system or an application (e.g., web browser) running on the computing device or system. In this regard, the GUI 100 may be provided by an operating system or an application running on the operating system.

As illustrated in the example shown in FIG. 1, a window 110 and a window 120 included in the GUI 100 are provided for display in which the window 110 and the window 120 are horizontally adjacent to each other and the window 110 and the window 120 occupy a fullscreen of a display. In one example, the window 110 and the window 120 have identical vertical and horizontal dimensions (e.g., 800×1200 pixels each where the fullscreen resolution of the display is 1600×1200 pixels). The window 110 and the window 120 include respective graphical content. For example, the graphical content in some configurations includes scalable fonts. The graphical content of each of the window 110 and the window 120 may correspond to a respective web page and/or document. In the window 110, the graphical content has been scaled in order to meet a minimum DPI setting that provides fonts for display at a DPI setting legible to a user. In order to meet the minimum DPI setting, for this example, the content shown in the window 110 has been scaled to fit a horizontal dimension (or size) of the window 110. Since the content of the window 110 is not scaled to fit the entirety of the content within the window 110, a vertical scrollbar 115 is included in order to allow the user to view the remainder of the content that is not displayed. As shown in the window 120, an entirety of the graphical content is scaled to fit within the window 120. Thus, in the example of FIG. 1, respective graphical content is scaled and displayed at different DPI settings for the window 110 and the window 120 of the GUI 100. For instance, a DPI setting for the window 110 is greater than a DPI setting for the window 120 as the graphical content in the window 110 is scaled smaller than the graphical content shown in the window 120. However, it is appreciated that the respective content of the window 110 and the window 120 may be displayed at the same DPI settings in some configurations.

Although the example shown in FIG. 1 illustrates the GUI 100 in a particular arrangement, other types of arrangements for displaying the GUI 100 could be provided and still be within the scope of the subject technology. Although graphical content related to scalable fonts is shown in the example of FIG. 1, it should be appreciated that other types of graphical content such as one or more different graphical elements may be provided and still be within the scope of the subject technology. A graphical element can include, but is not limited to, a button, check box, radio button, slider, list box, drop-down list, menu, combo box, icon, text box, scroll bar, etc. Further, one or more graphical images or video content may be provided by the GUI 100.

Figure 2:
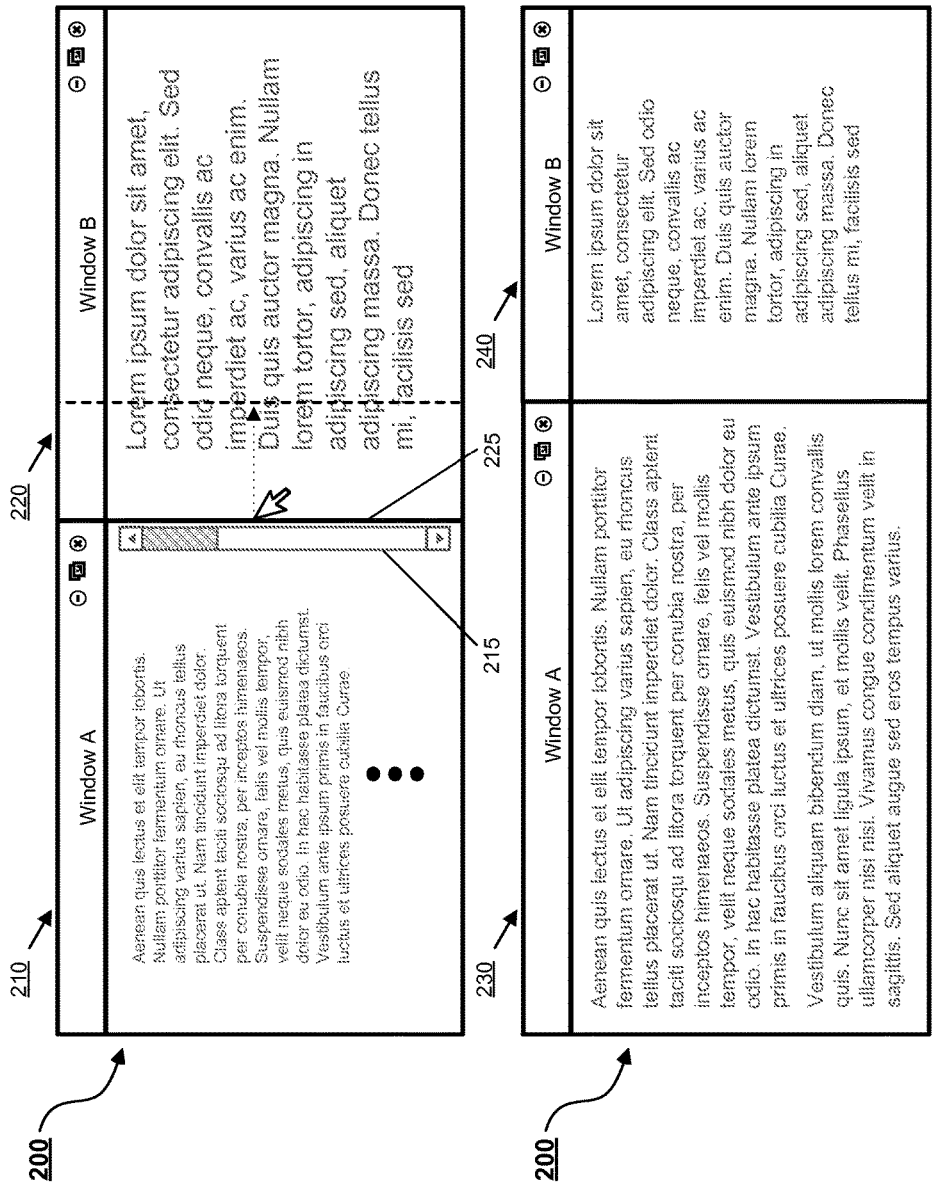

FIG. 2 conceptually illustrates an example GUI 200 for displaying graphical content after receiving input for adjusting a size of a particular window in which some configurations of the subject technology can be implemented. The GUI 200 illustrated in FIG. 2 may be provided on one or more computing devices or systems. For instance, the GUI 200 may be provided on a computing device or system, which may provide an operating system or an application (e.g., web browser) running on the computing device or system. In this regard, the GUI 200 may be provided by an operating system or an application running on the operating system.

As illustrated in the example shown in FIG. 2, a window 210 and a window 220 included in the GUI 200 are provided for display horizontally adjacent to each other, and the window 210 and the window 220 occupy a fullscreen of a display. The window 210 and the window 220 include respective graphical content (e.g., scalable fonts). In the window 210, the graphical content has been scaled in order to meet a minimum DPI setting that provides fonts for display at a DPI setting legible to a user. The content shown in the window 210 has been scaled to fit a horizontal dimension (or size) of the window 210 and a vertical scrollbar 215 is included in order to allow the user to view the remainder of the content that is not displayed. As shown in the window 220, an entirety of the graphical content is scaled to fit within the window 220. The respective graphical content is displayed at different DPI settings for the window 210 and the window 220 of the GUI 200 in this example.

Each window shown in FIG. 2 represents a non-overlapping window that "snaps" together with another horizontally adjacent window such that input for enlarging a window will simultaneously decrease the size of the horizontally adjacent window. The windows 210 and 220 share a border 225 and scaling respective graphical content in the windows 210 and 220 may be in response to receiving input for moving the shared border 225. Thus, scaling respective graphical content for displaying in the windows 210 and 220 occurs simultaneously in response to receiving input for a single command. In an example in which the respective horizontal sizes of the windows 210 and 220 are each X pixels, and the received input includes a value of y pixels for increasing the horizontal size of the window 210, the adjusted horizontal size of the windows 210 and 220 are X+y pixels and X−y pixels, respectively. As shown, input (e.g., via a mouse cursor or touch input, etc.) for adjusting a horizontal size or dimension of the window 210 may be received by the GUI 200. In response to the received input, the GUI 200 may scale the respective content of the window 210 accordingly to take advantage of the increased horizontal size, which is represented as a window 230. After the respective graphical content is scaled to a lower DPI setting than a DPI setting for the window 210, the example in FIG. 2 illustrates that an entirety of the graphical content is now displayed in the window 230 and a vertical scrollbar is no longer required to view all the content. Additionally, the GUI 200 may scale the respective content of the window 220 in response to the received input that further requests that the window 220 be decreased in size as shown in a window 240. The window 240 includes scaled graphical content at a higher DPI setting than a DPI setting of the window 220 based on the smaller horizontal dimension of the window 240 in response to the received input.

Although the example shown in FIG. 2 illustrates the GUI 200 in a particular arrangement, other types of arrangements for displaying the GUI 200 could be provided and still be within the scope of the subject technology. Although graphical content related to scalable fonts are shown in the example of FIG. 2, it should be appreciated that other types of graphical content such as one or more different graphical elements may be provided and still be within the scope of the subject technology. Further, one or more graphical images or video content may be provided by the GUI 200.

Figure 3:
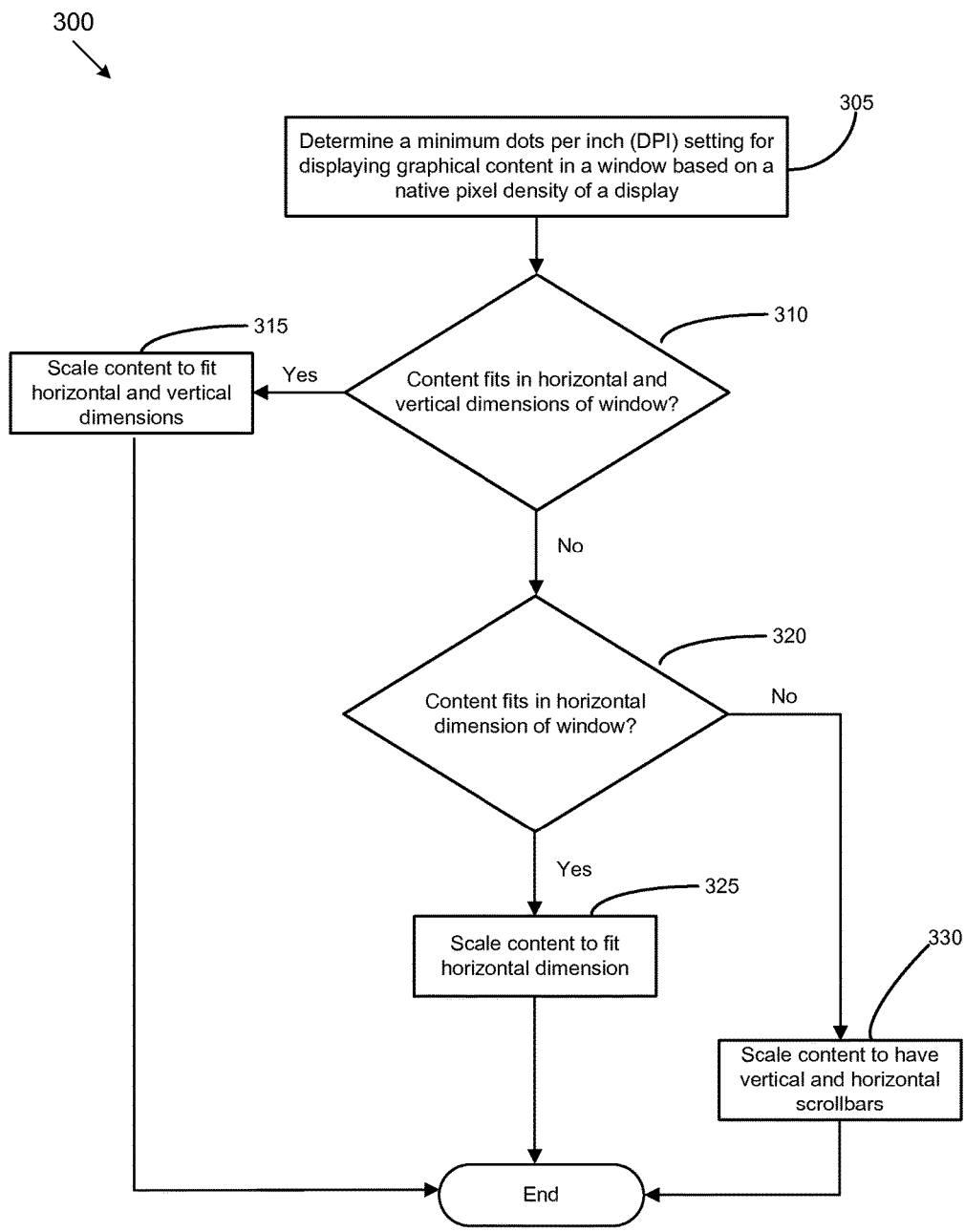
FIG. 3 conceptually illustrates an example process for scaling graphical content in one or more windows according to some configurations of the subject technology.

FIG. 3 conceptually illustrates an example process 300 for scaling graphical content in one or more windows according to some configurations of the subject technology. The process 300 can be performed on one or more computing devices or systems in some configurations. More specifically, the process 300 may be implemented for scaling graphical content of a window(s) as described in the example of FIGS. 1 and 2.

The process 300 starts at 305 by determining a minimum dots per inch (DPI) setting for displaying graphical content in a window based on a native pixel density of a display. In some configurations, the graphical content includes one or more scalable fonts. The native pixel density of the display is measured in pixels per inch (PPI) in one example. Further, the minimum DPI setting is a setting configured to provide legibility of fonts included in a respective window in one example. By way of example, the minimum DPI setting is configured based on the user's eyesight that indicates a minimum size for legibility of fonts.

The process 300 at 310 determines if the graphical content fits in a horizontal and vertical dimensions of the window based on the minimum DPI setting. If the graphical content fits in the horizontal and vertical dimensions of the window, the process 300 continues to 315 to scale the graphical content to fit the horizontal and vertical dimensions of the window based on the minimum DPI setting. In this instance, scaling the graphical content for displaying in the window scales an entirety of the graphical content to fit the horizontal dimension and the vertical dimension of the window. The entirety of the respective graphical content includes an entire content of a respective web page or document in one example. Thus, scaling respective graphical content for displaying in the window maximizes viewable content in the window.

Alternatively, if the graphical content does not fit in the horizontal and vertical dimensions of the window, the process 300 continues to 320. At 320, the process 300 determines if the graphical content fits in the horizontal dimension of the window based on the minimum DPI setting. If the graphical content fits in the horizontal dimension of the window, the process 300 continues to 315 to scale the graphical content to fit the horizontal dimension of the window based on the minimum DPI setting. In some configurations, a vertical scrollbar will be provided in the window in order to enable a user to view any scaled graphical content that does not fit in the window.

Alternatively, if the graphical content does not fit in the horizontal dimension of the window, the process 300 continues to 330. The process 300 at 300 scales the graphical content based on the minimum DPI setting to have horizontal and/or vertical scrollbars. The process 300 then ends. In some configurations, a fallback to a mobile version of the graphical content is attempted before falling back to show a horizontal scrollbar at 330. If there is no mobile equivalent of the content for display, then horizontal and/or vertical scrollbars are shown at 330.

Although the example described in connection with FIG. 3 describes scaling graphical content for a single window, it should be understood that the operations described in FIG. 3 could be applied for scaling graphical content in a second window (or any number of additional windows). Moreover, scaling respective graphical content for display in different windows may be according to different DPI in some instances.

Figure 4:
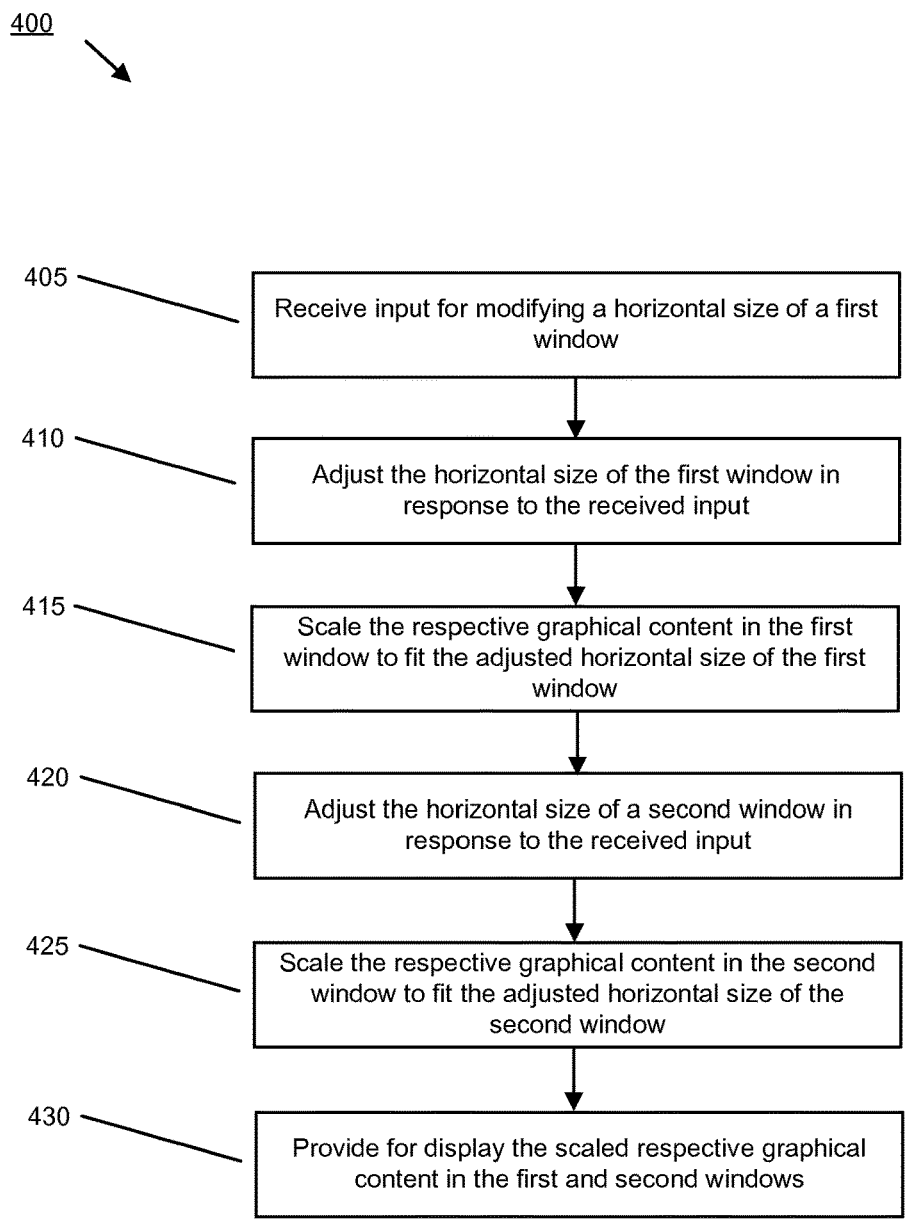
FIG. 4 conceptually illustrates an example process for scaling graphical content in response to input that adjusts a size of a window in which some configurations of the subject technology can be implemented.

FIG. 4 conceptually illustrates an example process 400 for scaling graphical content in response to input that adjusts a size of a window in which some configurations of the subject technology can be implemented. The process 400 can be performed by one or more computing devices or systems in some configurations. More specifically, the process 400 may be implemented for scaling graphical content of a window(s) as described in the example of FIGS. 1 and 2.

The process 400 begins at 405 by receiving input for modifying a horizontal size of a first window. The first window includes respective graphical content for display. In one example, the received input includes input for increasing the horizontal size of the first window. Further, the received input may include input for decreasing the horizontal size of the second window. The process 400 at 410 adjusts the horizontal size of the first window in response to the received input. At 415, the process 400 scales the respective graphical content in the first window to fit the adjusted horizontal size of the first window. The process 400 continues to 420 to adjust the horizontal size of a second window in response to the received input in which the second window includes respective graphical content for display. At 425, the process 400 scales the respective graphical content in the second window to fit the adjusted horizontal size of the second window. The process 400 at 430 provides for display the scaled respective graphical content in the first and the second windows. In some configurations, the scaled respective graphical content of the first window is displayed at a lower DPI (e.g., enlarging the graphical content) than the scaled respective graphical content of the second window. The process 400 then ends.

Figure 5:
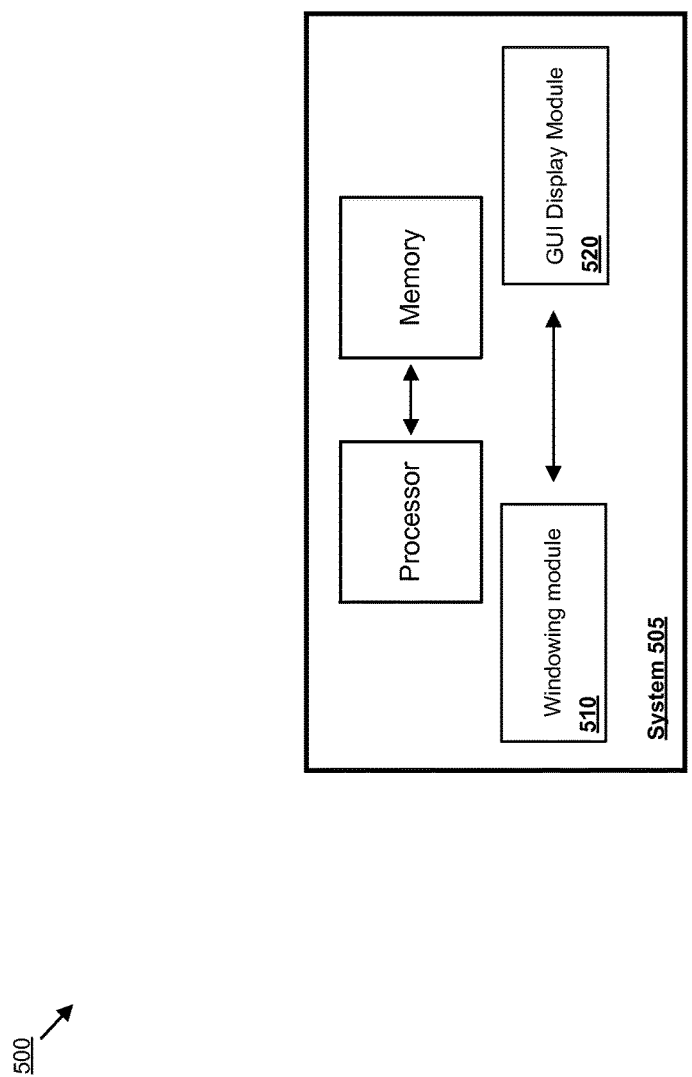
FIG. 5 conceptually illustrates an example computing environment including a system.

FIG. 5 conceptually illustrates an example computing environment 500 including a system. In particular, FIG. 5 shows a system 505 for implementing the above described GUI in FIGS. 1 and 2 and the processes in FIGS. 3 and 4. In some configurations, the system 505 is part of an implementation running a particular machine (e.g., client computer, laptop, notebook, netbook, etc.).

The system 505 can include memory, one or more processors, and one or more modules stored in memory and configured for execution by the one or more processors. As shown in FIG. 5, the system 505 includes several modules for providing different functionality. The system 505 is configured to include a windowing module 510 and a graphical user interface (GUI) display module 520.

The windowing module 510 is configured to determine a minimum dots per inch (DPI) setting for displaying graphical content in a window based on a native pixel density of a display, scale respective graphical content for displaying in a first window based on the minimum DPI setting to fit a horizontal dimension of the first window, and scale respective graphical content for displaying in a second window based on the minimum DPI setting to fit a horizontal dimension of the second window. The GUI display module 520 is configured to provide for display the scaled respective graphical content in the first window and the second window.

In some configurations, the windowing module 510 is further configured to receive input for modifying a horizontal size of a first window in which the first window includes respective graphical content for display, adjust the horizontal size of the first window in response to the received input, and scale the respective graphical content in the first window to fit the adjusted horizontal size of the first window. The windowing module 510 is further configured to adjust the horizontal size of a second window in response to the received input in which the second window includes respective graphical content for display, and scale the respective graphical content in the second window to fit the adjusted horizontal size of the second window. After scaling the respective graphical content in the first and second windows in response to adjusting the horizontal sizes of the windows, the GUI display module 520 is further configured to provide for display the scaled respective graphical content in the first window and the scaled respective graphical content in the second window.

As further shown in FIG. 5, each of the aforementioned modules can be configured to communicate between each other. For instance, different data, messages, API calls and returns can be passed between the different modules in the system 505.

Many of the above-described features and applications are implemented as software processes that are specified as a set of instructions recorded on a machine readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of machine readable media include, but are not limited to, CD-ROMs, flash drives, RAM chips, hard drives, EPROMs, etc. The machine readable media does not include carrier waves and electronic signals passing wirelessly or over wired connections.

In this specification, the term "software" is meant to include firmware residing in read-only memory and/or applications stored in magnetic storage, which can be read into memory for processing by a processor. Also, in some implementations, multiple software components can be implemented as sub-parts of a larger program while remaining distinct software components. In some implementations, multiple software subject components can also be implemented as separate programs. Finally, a combination of separate programs that together implement a software component(s) described here is within the scope of the subject technology. In some implementations, the software programs, when installed to operate on one or more systems, define one or more specific machine implementations that execute and perform the operations of the software programs.

A computer program (also known as a program, software, software application, script, or code) can be written in a form of programming language, including compiled or interpreted languages, declarative or procedural languages, and it can be deployed in some form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some configurations are implemented as software processes that include one or more application programming interfaces (APIs) in an environment with calling program code interacting with other program code being called through the one or more interfaces. Various function calls, messages or other types of invocations, which can include various kinds of parameters, can be transferred via the APIs between the calling program and the code being called. In addition, an API can provide the calling program code the ability to use data types or classes defined in the API and implemented in the called program code.

One or more APIs may be used in some configurations. An API is an interface implemented by a program code component or hardware component ("API implementing component") that allows a different program code component or hardware component ("API calling component") to access and use one or more functions, methods, procedures, data structures, classes, and/or other services provided by the API implementing component. An API can define one or more parameters that are passed between the API calling component and the API implementing component.

The following description describes an example system in which aspects of the subject technology can be implemented.

Figure 6:
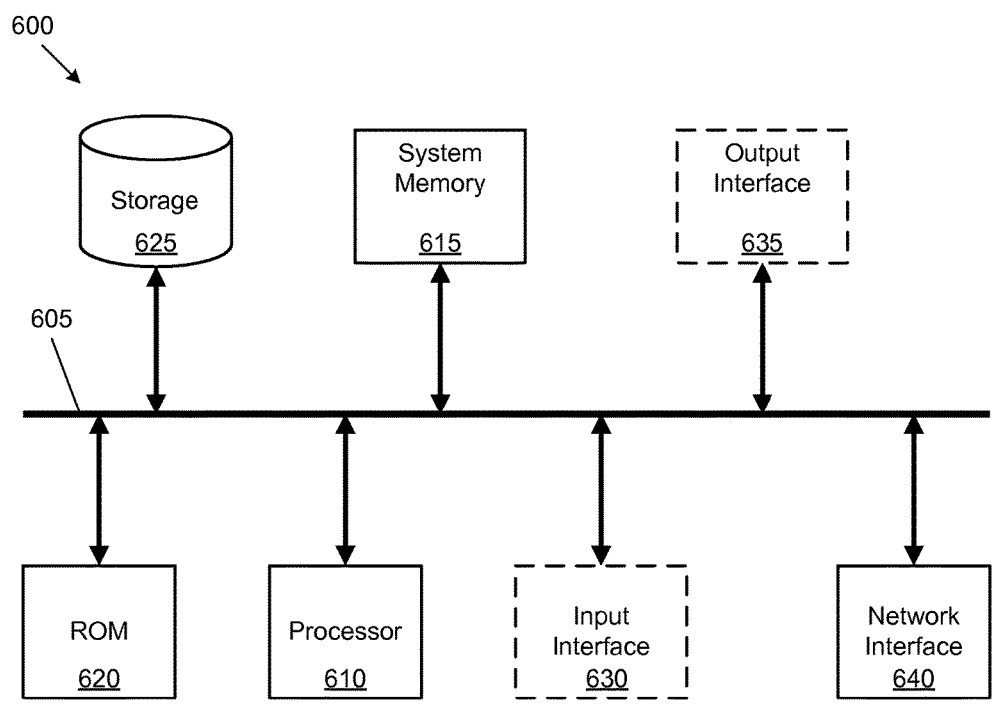
FIG. 6 conceptually illustrates a system with which some implementations of the subject technology may be implemented.

FIG. 6 conceptually illustrates a system 600 with which some implementations of the subject technology can be implemented. The system 600 can be a computer, phone, PDA, or another sort of electronic device. In some configurations, the system 600 includes a television with one or more processors embedded therein. Such a system includes various types of computer readable media and interfaces for various other types of computer readable media. The system 600 includes a bus 605, processing unit(s) 610, a system memory 615, a read-only memory 620, a storage device 625, an optional input interface 630, an optional output interface 635, and a network interface 640.

The bus 605 collectively represents all system, peripheral, and chipset buses that communicatively connect the numerous internal devices of the system 600. For instance, the bus 605 communicatively connects the processing unit(s) 610 with the read-only memory 620, the system memory 615, and the storage device 625.

From these various memory units, the processing unit(s) 610 retrieves instructions to execute and data to process in order to execute the processes of the subject technology. The processing unit(s) can be a single processor or a multi-core processor in different implementations.

The read-only-memory (ROM) 620 stores static data and instructions that are needed by the processing unit(s) 610 and other modules of the system 600. The storage device 625, on the other hand, is a read-and-write memory device. This device is a non-volatile memory unit that stores instructions and data even when the system 600 is off. Some implementations of the subject technology use a mass-storage device (such as a magnetic or optical disk and its corresponding disk drive) as the storage device 625.

Other implementations use a removable storage device (such as a flash drive, a floppy disk, and its corresponding disk drive) as the storage device 625. Like the storage device 625, the system memory 615 is a read-and-write memory device. However, unlike storage device 625, the system memory 615 is a volatile read-and-write memory, such a random access memory. The system memory 615 stores some of the instructions and data that the processor needs at runtime. In some implementations, the subject technology's processes are stored in the system memory 615, the storage device 625, and/or the read-only memory 620. For example, the various memory units include instructions for processing multimedia items in accordance with some implementations. From these various memory units, the processing unit(s) 610 retrieves instructions to execute and data to process in order to execute the processes of some implementations.

The bus 605 also connects to the optional input and output interfaces 630 and 635. The optional input interface 630 enables the user to communicate information and select commands to the system. The optional input interface 630 can interface with alphanumeric keyboards and pointing devices (also called "cursor control devices"). The optional output interface 635 can provide display images generated by the system 600. The optional output interface 635 can interface with printers and display devices, such as cathode ray tubes (CRT) or liquid crystal displays (LCD). Some implementations can interface with devices such as a touchscreen that functions as both input and output devices.

Finally, as shown in FIG. 6, bus 605 also couples system 600 to a network interface 640 through a network adapter (not shown). In this manner, the computer can be a part of a network of computers (such as a local area network ("LAN"), a wide area network ("WAN"), or an Intranet, or an interconnected network of networks, such as the Internet. The components of system 600 can be used in conjunction with the subject technology.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and the claims of this application, the terms "computer", "server", "processor", and "memory" all refer to electronic or other technological devices. These terms exclude people or groups of people. For the purposes of the specification, the terms display or displaying means displaying on an electronic device. As used in this specification and the claims of this application, the terms "computer readable medium" and "computer readable media" are entirely restricted to tangible, physical objects that store information in a form that is readable by a computer. These terms exclude wireless signals, wired download signals, and other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be a form of sensory feedback, e.g., visual feedback, auditory feedback, or tactile feedback; and input from the user can be received in a form, including acoustic, speech, or tactile input. In addition, a computer can interact with a user by sending documents to and receiving documents from a device that is used by the user; for example, by sending web pages to a web browser on a user's client device in response to requests received from the web browser.

Configurations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or a combination of one or more such back end, middleware, or front end components. The components of the system can be interconnected by a form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some configurations, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that a specific order or hierarchy of steps in the processes disclosed is an illustration of example approaches. Based upon design preferences, it is understood that the specific order or hierarchy of steps in the processes can be rearranged, or that all illustrated steps be performed. Some of the steps can be performed simultaneously. For example, in certain circumstances, multitasking and parallel processing can be advantageous. Moreover, the separation of various system components in the configurations described above should not be understood as requiring such separation in all configurations, and it should be understood that the described program components and systems can generally be integrated together in a single software product or packaged into multiple software products.

The previous description is provided to enable a person skilled in the art to practice the various aspects described herein. Various modifications to these aspects will be readily apparent to those skilled in the art, and the generic principles defined herein can be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase such as an "aspect" does not imply that such aspect is essential to the subject technology or that such aspect applies to all configurations of the subject technology. A disclosure relating to an aspect can apply to all configurations, or one or more configurations. A phrase such as an aspect can refer to one or more aspects and vice versa. A phrase such as a "configuration" does not imply that such configuration is essential to the subject technology or that such configuration applies to all configurations of the subject technology. A disclosure relating to a configuration can apply to all configurations, or one or more configurations. A phrase such as a configuration can refer to one or more configurations and vice versa.

The word "example" is used herein to mean "serving as an example or illustration." An aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims.

What is claimed is:

1. A computer-implemented method, the method comprising:
   determining a minimum dots per inch (DPI) setting for displaying graphical content in a window based on a native pixel density of a display;
   receiving an input for modifying a size of a first window;
   adjusting the size of the first window and a size of a second window on the display in response to the received input;
   scaling, in response to the received input, first graphical content for displaying, on the display, in the first window based on a first DPI setting that is at least the minimum DPI setting to fit a horizontal dimension of the first window, wherein the first graphical content includes one or more first fonts, scaling first graphical content for displaying in the first window includes dynamically adjusting a first current DPI setting of the first window within a range of DPI settings that provides the one or more first fonts for display at the first DPI setting;
   scaling, in response to the received input, second graphical content for displaying, on the display, in the second window based on a second DPI setting that is at least the minimum DPI setting to fit a horizontal dimension of the second window, wherein the second window is displayed with the first window on the display, the second graphical content includes one or more second fonts, wherein scaling second graphical content for displaying in the second window further includes dynamically adjusting a second current DPI setting of the second window within the range of DPI settings that provides the one or more second fonts for display at the second DPI setting, and wherein the first DPI setting is different than the minimum DPI setting, the second DPI setting is different than the minimum DPI setting, and the first DPI setting and the second DPI setting are different DPI settings; and displaying, on the display, the first scaled content and the second scaled content.

2. The method of claim 1, wherein the first window and the second window occupy a fullscreen of the display.

3. The method of claim 1, wherein the first window and the second window share a border.

4. The method of claim 3, wherein scaling first graphical content for displaying in the first window and scaling second graphical content for displaying in the second window is in response to receiving input for moving the shared border.

5. The method of claim 4, wherein scaling first graphical content for displaying in the first window and scaling second graphical content for displaying in the second window occurs simultaneously in response to receiving input for a single command.

6. The method of claim 1, wherein scaling first graphical content for displaying in the first window and scaling second graphical content for displaying in the second window maximizes viewable content in each of the first and the second windows.

7. The method of claim 1, wherein the first window is displayed as a horizontally adjacent window to the second window.

8. The method of claim 1, wherein the graphical content includes one or more scalable fonts.

9. The method of claim 1, wherein the native pixel density of the display is measured in pixels per inch (PPI).

10. The method of claim 1, wherein the minimum DPI setting comprises a setting configured to provide legibility of fonts included in a respective window.

11. The method of claim 10, wherein the minimum DPI setting is configured based on a user's eyesight.

12. The method of claim 1, wherein scaling first graphical content for displaying in the first window scales an entirety of the respective graphical content to fit the horizontal dimension and a vertical dimension of the first window.

13. The method of claim 12, wherein the entirety of the first graphical content comprises an entire content of a respective web page or document.

14. A computer-implemented method, the method comprising:
receiving input for modifying a horizontal size of a first window, wherein the first window includes first graphical content for display;
adjusting the horizontal size of the first window in response to the received input;
scaling, in response to the received input, the first graphical content, on a display, in the first window to fit the adjusted horizontal size of the first window based on a first dots per inch (DPI) setting that is at least a minimum DPI setting for displaying graphical content in a window based on a native pixel density of the display, wherein the first graphical content includes one or more first fonts, scaling the first graphical content in the first window includes dynamically adjusting a first current DPI setting of the first window within a range of DPI settings that provides the one or more first fonts for display at the first DPI setting;
adjusting the horizontal size of a second window in response to the received input, wherein the second window includes second graphical content for display;
scaling, in response to the received input, the second graphical content, on the display, in the second window to fit the adjusted horizontal size of the second window based on a second dots per inch (DPI) setting that is at least the minimum DPI setting, wherein the second window is displayed with the first window on the display, the second graphical content includes one or more second fonts, wherein scaling the second graphical content in the second window includes dynamically adjusting a second current DPI setting of the second window within the range of DPI settings that provides the one or more second fonts for display at the second DPI setting, and wherein the first DPI setting is different than the minimum DPI setting, the second DPI setting is different than the minimum DPI setting, and the first DPI setting and the second DPI setting are different DPI settings;
providing for display the scaled first graphical content in the first window; and
providing for display the scaled second graphical content in the second window.

15. The method of claim 14, wherein the received input comprises input for increasing the horizontal size of the first window.

16. The method of claim 15, wherein the received input further comprises input for decreasing the horizontal size of the second window.

17. The method of claim 14, wherein the first window and the second window occupy a fullscreen of the display.

18. The method of claim 14, wherein the first window is displayed as a horizontally adjacent window to the second window.

19. A system, the system comprising:
one or more processors;
a memory storing one or more instructions, which when executed by the one or more processors, cause the one or more processors to:
determine a minimum dots per inch (DPI) setting or displaying graphical content in a window based on a native pixel density of a display;
receive an input for modifying a size of a first window;
adjust the size of the first window and a size of a second window on the display in response to the received input;
scale, in response to the received input, first graphical content for displaying, on the display, in the first window based on a first DPI setting that is at least the minimum DPI setting to fit a horizontal dimension of the first window, wherein the first graphical content includes one or more first fonts, wherein to scale first graphical content for displaying in the first window includes dynamically adjusting a first current DPI setting of the first window within a range of DPI settings that provides the one or more first fonts for display at the first DPI setting;
scale, in response to the received input, second graphical content for displaying, on the display, in the second window based on a second DPI setting that is at least the minimum DPI setting to fit a horizontal dimension of the second window, wherein the second graphical content includes one or more second fonts, wherein to scale second graphical content for displaying in the second window further includes dynamically adjusting a second current DPI setting of the second window within the range of DPI settings that provides the one or more second fonts for display at the second DPI setting, and wherein the first DPI setting is different than the minimum DPI setting, the second DPI setting is different than the minimum DPI setting, and the first DPI setting and the second DPI setting are different DPI settings; and displaying, on the display, the scaled first graphical content in the first window with the scaled second graphical content in the second window.

20. The system of claim 19, wherein the memory includes further instructions, which when executed by the one or more processors further cause the one or more processors to:
receive input for modifying a horizontal size of the first window, wherein the first window includes respective graphical content for display; and
adjust the horizontal size of the first window in response to the received input; and
scale the respective graphical content in the first window to fit the adjusted horizontal size of the first window.

21. The system of claim 20, wherein the memory includes further instructions, which when executed by the one or more processors further cause the one or more processors to:
adjust the horizontal size of the second window in response to the received input, wherein the second window includes respective graphical content for display; and
scale the respective graphical content in the second window to fit the adjusted horizontal size of the second window.

22. The system of claim 21, wherein the memory includes further instructions, which when executed by the one or more processors further cause the one or more processors to:
provide for display the scaled respective graphical in the first window and the scaled respective graphical content in the second window.

23. A non-transitory machine-readable medium comprising instructions stored therein, which when executed by a machine, cause the machine to perform operations comprising:
determining a minimum dots per inch (DPI) setting for displaying graphical content in a window based on a native pixel density of a display;
receiving an input for modifying a size of a first window;
adjusting the size of the first window and a size of a second window on the display in response to the received input;
scaling, in response to the received input, first graphical content for displaying, on the display, in the first window based on a first DPI setting that is at least the minimum DPI setting to fit a horizontal dimension of the first window, wherein the first graphical content includes one or more first fonts, scaling first graphical content for displaying in the first window includes dynamically adjusting a first current DPI setting of the first window within a range of DPI settings, the dynamically adjusting the first current DPI setting providing the one or more first fonts for display at the first DPI setting;
scaling, in response to the received input, second graphical content for displaying, on the display, in the second window based on a second DPI setting that is at least the minimum DPI setting to fit a horizontal dimension of the second window, wherein the second window is displayed with the first window on the display, the second graphical content includes one or more second fonts, wherein scaling second graphical content for displaying in the second window further includes dynamically adjusting a second current DPI setting of the second window within the range of DPI settings that provides the one or more second fonts for display at the second DPI setting, and wherein the first DPI setting is different than the minimum DPI setting, the second DPI setting is different than the minimum DPI setting, and the first DPI setting and the second DPI setting are different DPI settings; and
displaying, on the display, the first scaled content and the second scaled content.

* * * * *